US012432622B2

(12) United States Patent
Fang et al.

(10) Patent No.: US 12,432,622 B2
(45) Date of Patent: Sep. 30, 2025

(54) NETWORK SLICE-SPECIFIC AGGREGATE MAXIMUM BIT RATE (AMBR) CONFIGURATION

(71) Applicant: ZTE Corporation, Guangdong (CN)

(72) Inventors: Jianmin Fang, Guangdong (CN); He Huang, Guangdong (CN)

(73) Assignee: ZTE Corporation, Guangdong (CN)

( * ) Notice: Subject to any disclaimer, the term of this patent is extended or adjusted under 35 U.S.C. 154(b) by 398 days.

(21) Appl. No.: 18/060,768

(22) Filed: Dec. 1, 2022

(65) Prior Publication Data
US 2023/0087000 A1 Mar. 23, 2023

Related U.S. Application Data

(63) Continuation of application No. PCT/CN2020/093668, filed on Jun. 1, 2020.

(51) Int. Cl.
H04W 28/24 (2009.01)
H04W 28/02 (2009.01)

(52) U.S. Cl.
CPC ....... *H04W 28/24* (2013.01); *H04W 28/0268* (2013.01)

(58) Field of Classification Search
CPC .. H04L 47/78; H04W 28/24; H04W 28/0268; H04W 28/0831; H04W 28/0864
See application file for complete search history.

(56) References Cited

U.S. PATENT DOCUMENTS

| 2019/0159027 | A1 | 5/2019 | Kuge et al. |
| 2019/0297634 | A1 | 9/2019 | Dai et al. |
| 2020/0260324 | A1* | 8/2020 | Byun .................. H04W 4/70 |
| 2023/0072593 | A1* | 3/2023 | Il ..................... H04L 41/0896 |

FOREIGN PATENT DOCUMENTS

| CN | 107105457 | 8/2017 |
| CN | 108632887 | 10/2018 |
| CN | 109155949 | 1/2019 |

(Continued)

OTHER PUBLICATIONS

LG Electronics Inc., "UE-AMBR derivation in RAN", 3GPP TSG-RAN WG3 Meeting #97, R3-173006, Aug. 21, 2017-Aug. 25, 2017. (Year: 2017).*

(Continued)

*Primary Examiner* — Khoa Huynh
(74) *Attorney, Agent, or Firm* — Perkins Coie LLP

(57) ABSTRACT

The present document relates to methods, systems, and devices related to digital wireless communication, and more specifically, to techniques related to configuring network slice-specific aggregate maximum bit rates (AMBRs). In one exemplary aspect, a method for wireless communication is disclosed. The method includes obtaining, by a first network function, one or more maximum bit rates that are specific to network slices configured for a terminal. The method also includes transmitting, by the first network function, the one or more maximum bit rates to a second network function, wherein the second network function is configured to limit a bit rate of network flows for the terminal according to the one or more maximum bit rates.

18 Claims, 12 Drawing Sheets

(56) References Cited

FOREIGN PATENT DOCUMENTS

WO   2017/140387   8/2017
WO   2019/074433   4/2019

OTHER PUBLICATIONS

ZTE "Solution for KI#3 data rate per slice per UE" SA WG2 Meeting #136AH Jan. 13-17, Seoul, South Korea, S2-2000379, 2 pages.
Extended European Search Report for Co-Pending EP Application No. 20938596.2, dated Mar. 22, 2023 (10 pages).
ZTE "Solution for KI#3 data rate per slice per UE" SA WG2 Meeting #136 S2-1911403, Nov. 18-22, 2019, Reno, USA (revision of S2-190), 2 pages.
LG Electronics "UE-AMBR derivation in RAN," 3GPP TSG-RAN WG3 Meeting #97 R3-173006 Berlin, Germany, Aug. 21, 2017-Aug. 25, 2017, 21 pages.
International Search Report and Written Opinion International Application No. PCT/CN2020/093668, dated Feb. 25, 2021 (9 pages).
CNIPA, Notification to Complete Formalities of Registration for Chinese Application No. 2020801015510, mailed on Aug. 5, 2024, 4 pages with unofficial English translation.
Office Action for Co-Pending CN Application No. 2020801015510, dated May 20, 2024 (20 pages with unofficial translation).
Office Action for Co-Pending JP Application No. 2022-573459, dated Oct. 27, 2023 (6 pages with machine translation).
JPO, Notice of Allowance for Japanese Application No. 2022-573459, mailed on Feb. 14, 2024, 5 pages with English translation.

* cited by examiner

NETWORK SLICE-SPECIFIC AGGREGATE MAXIMUM BIT RATE (AMBR) CONFIGURATION

CROSS-REFERENCE TO RELATED APPLICATION

This application is a continuation and claims priority to International Application No. PCT/CN2020/093668, filed on Jun. 1, 2020, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to configuring network slice-specific aggregate maximum bit rates (AMBRs).

In one exemplary aspect, a method for wireless communication is disclosed. The method includes obtaining, by a first network function, one or more maximum bit rates that are specific to network slices configured for a terminal. The method also includes transmitting, by the first network function, the one or more maximum bit rates to a second network function, wherein the second network function is configured to limit a bit rate of network flows for the terminal according to the one or more maximum bit rates.

In another exemplary aspect, a method for wireless communication is disclosed. The method includes receiving, by a second network function, one or more maximum bit rates that are specific to network slices for a terminal from a first network function. The method also includes limiting, by the second network function, a bit rate of network flows for the terminal according to the one or more maximum bit rates.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the clauses.

DETAILED DESCRIPTION

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Figure 1:
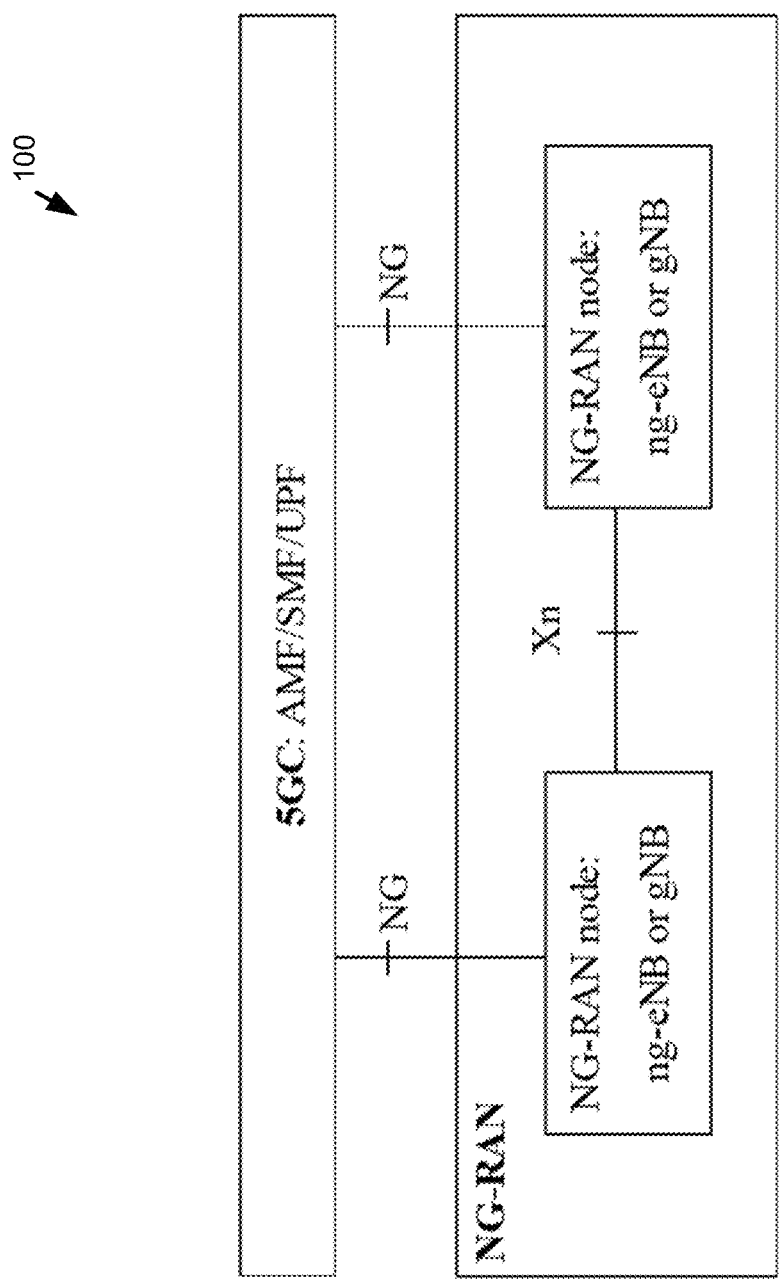
FIG. 1 illustrates an example 5G network architecture.

FIG. 1 illustrates an example 5G network architecture 100. A fifth generation (5G) network architecture may include a 5G core network (5GC) and a next generation radio access network (NG-RAN). The 5GC may include any of an Access Mobility Function (AMF), a Session Management Function (SMF), and a User Plane Function (UPF). NG-RAN may include base stations with different radio access technologies (RATs), such as an evolved 4G base station (ng-eNB), a 5G base station (gNB). The NG-RAN base station may be connected to the 5GC through the NG interface, and the NG-RAN base stations may be connected through the Xn interface.

Figure 2:
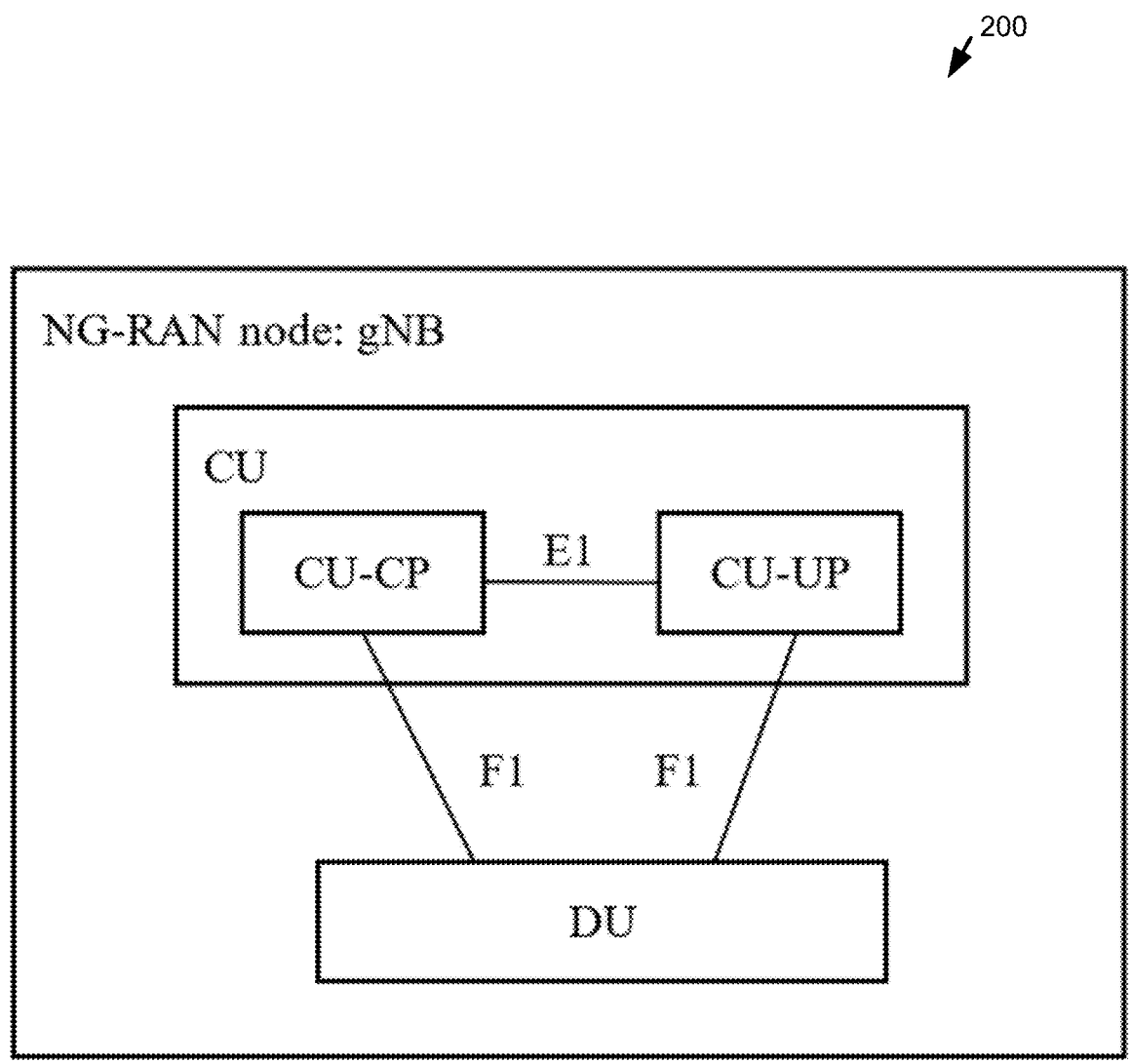
FIG. 2 illustrates an example split gNB structure.

FIG. 2 illustrates an example split gNB structure 200. A split gNB may include one CU and one or more DU, a CU may include one CP and one or more UP.

Figure 3:
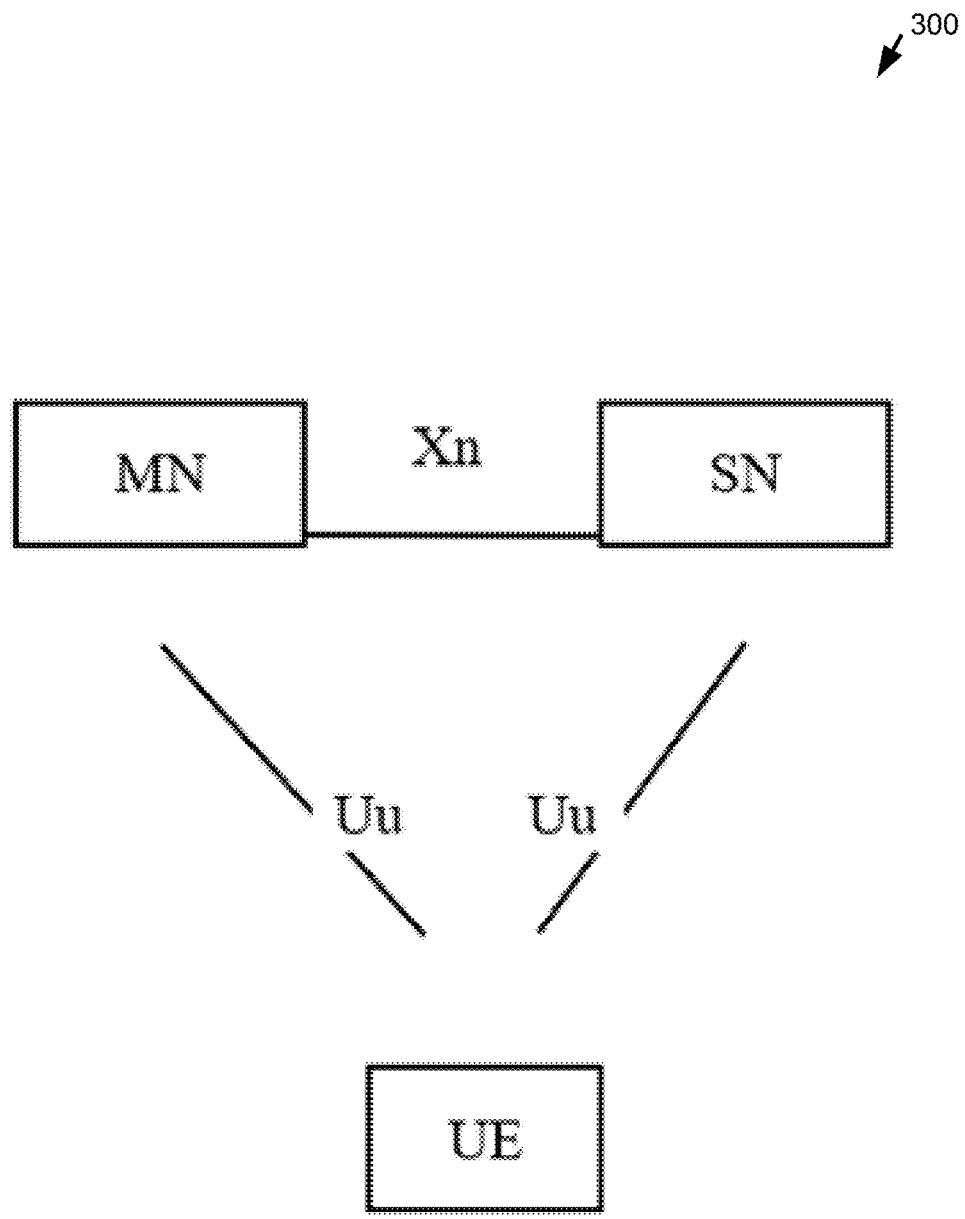
FIG. 3 illustrates an example Dual Connectivity (DC) architecture.

FIG. 3 illustrates an example Dual Connectivity (DC) architecture 300. A UE may connect to two NG-RAN nodes simultaneously, one can be the Master Node (MN), and the other can be the Secondary Node (SN).

In many cases, a network slice can be introduced. The NG-RAN can support resource isolation among slices. It may be possible to provide fully dedicated NG-RAN resources to a certain slice and to provide shared resource among slices.

System Overview

The present embodiments relate to configuring aggregate maximum bit rates (AMBRs). Particularly, the embodiments can relate to limiting the AMBR that can be provided across all non-GBR QoS flows for a specific slice or slice type. A first node (e.g., Node1) can send one or more slice specific AMBR to a second node (e.g., node2) for a UE. The slice specific AMBR can be for one slice specific AMBR for each slice or for each slice type. Node2 may limit the aggregate maximum bit rate that can be provided across all non-GBR QoS flows for each slice or for each slice type according to the received slice specific AMBR.

In a first instance, node1 can include a centralized unit (CU) and node2 can include a distributed unit (DU). In another instance, node1 can include a control plane (CP) and node2 can include a user plane (UP). In another instance, node1 can include a master node (MN) and node2 can include a secondary node (SN). In another instance, node1 can include a first next-generation (NG) radio access network (RAN) (NG-RAN) node and node2 can include a second NG-RAN node.

In the instance that node1 is a CU and node2 is a DU, the one or more slice specific AMBR can be included in a UE CONTEXT SETUP REQUEST message or a UE CONTEXT MODIFICATION REQUEST message.

In the instance that node1 is a CP and node2 is a UP, the one or more slice specific AMBR can be included in a BEARER CONTEXT SETUP REQUEST message or a BEARER CONTEXT MODIFICATION REQUEST message.

In the instance that node1 is a MN and node2 is a SN, the MN can determine the MN part slice specific AMBR and SN part slice specific AMBR for each slice or for each slice type. The one or more SN part slice specific AMBR can be included in the S-NODE ADDITION REQUEST message or a S-NODE MODIFICATION REQUEST message.

In the instance that node1 is a first NG-RAN node and node2 is a NG-RAN node, the one or more slice specific AMBR can be included in a HANDOVER REQUEST message or a RETRIEVE UE CONTEXT RESPONSE message.

In some embodiments, node1 can obtain one or more slice specific AMBR by receiving the one or more slice specific AMBR from a core network (CN) node or calculate the one or more slice specific AMBR based on one or more received protocol data unit (PDU) Session AMBRs from the CN node.

In an instance that node1 receives one or more slice specific AMBR from CN, the one or more slice specific AMBR can be included in an INITIAL CONTEXT SETUP REQUEST message, a PDU SESSION RESOURCE SETUP REQUEST message, a PDU SESSION RESOURCE MODIFY REQUEST message, a HANDOVER REQUEST message, or a PATH SWITCH REQUEST ACKNOWLEDGE message.

Example Embodiment 1

Figure 4:
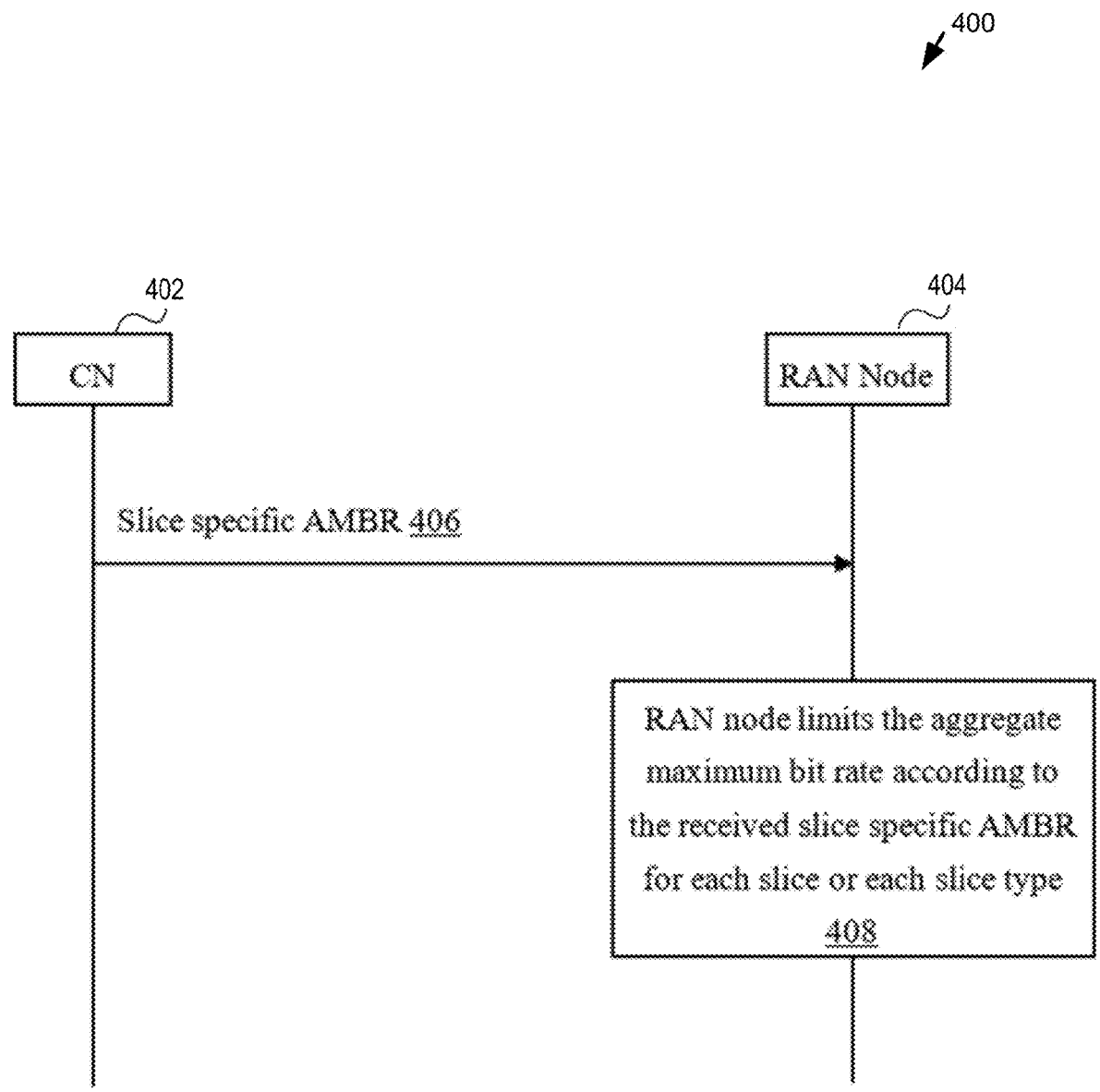
FIG. 4 illustrates an example signaling process for slice specific AMBR corresponding to a first example embodiment.

FIG. 4 illustrates an example signaling process 400 for slice specific AMBR corresponding to a first example embodiment.

In step 406, a CN 402 can send one or more slice specific AMBR for a UE to a RAN node 404. One slice specific AMBR can be for each slice (identified by the S-NSSAI) or for each slice type (identified by the SST). The one or more slice specific AMBR can be in included in the INITIAL CONTEXT SETUP REQUEST message, PDU SESSION RESOURCE SETUP REQUEST message, PDU SESSION RESOURCE MODIFY REQUEST message, HANDOVER REQUEST message, or PATH SWITCH REQUEST ACKNOWLEDGE message.

In step 408, the RAN node 404 can limit the aggregate maximum bit rate that can be provided across all non-GBR QoS flows for each slice or for each slice type according to the received slice specific AMBR.

Example Embodiment 2

Figure 5:
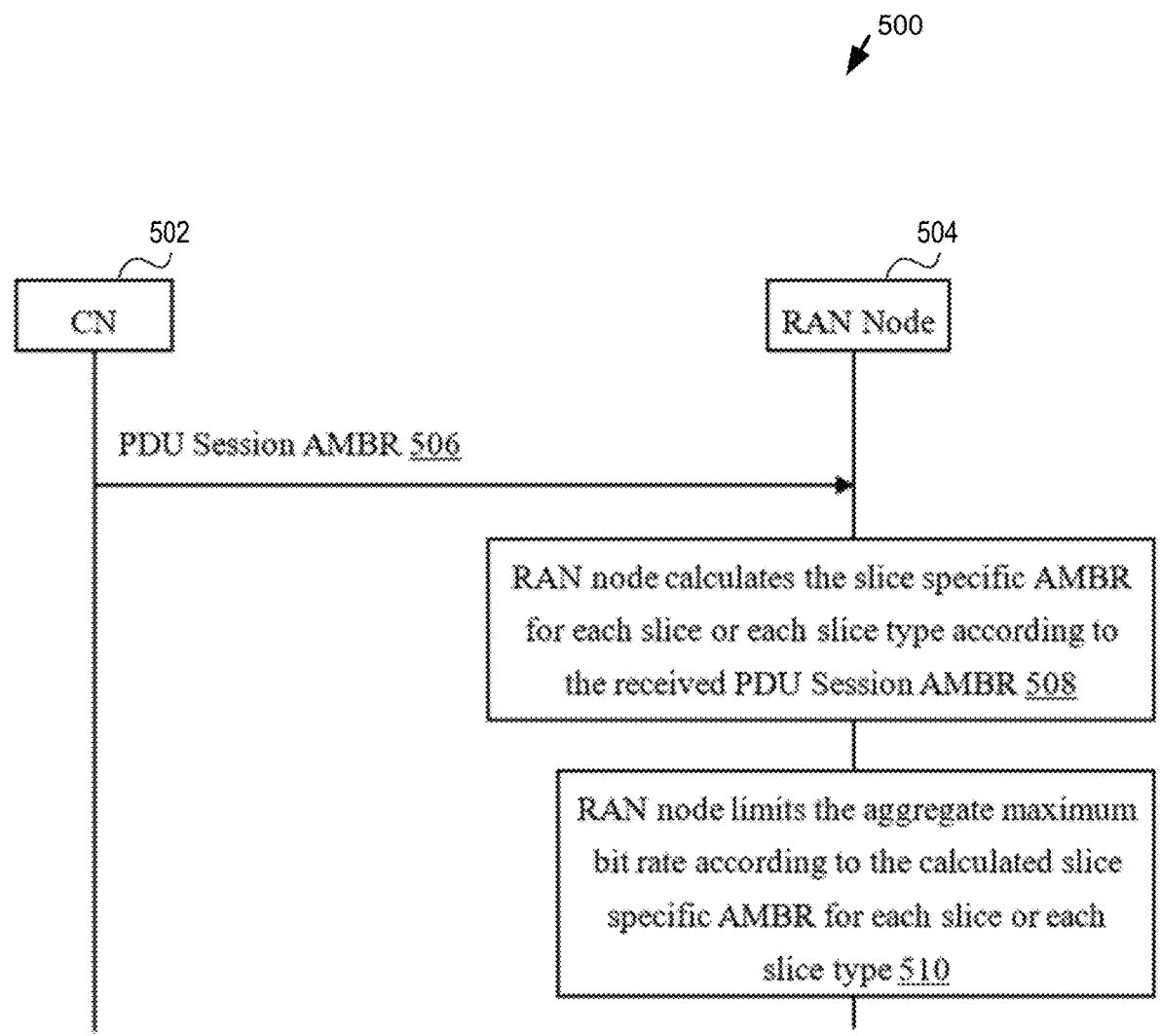
FIG. 5 illustrates an example signaling process for slice specific AMBR corresponding to a second example embodiment.

FIG. 5 illustrates an example signaling process 500 for slice specific AMBR corresponding to a second example embodiment.

In step 506, the CN 502 can send one or more PDU Session AMBR for a UE to a RAN node 504, with one PDU Session AMBR for each PDU Session. The one or more PDU Session AMBR can be in included in the INITIAL CONTEXT SETUP REQUEST message, PDU SESSION RESOURCE SETUP REQUEST message, PDU SESSION RESOURCE MODIFY REQUEST message, HANDOVER REQUEST message, or PATH SWITCH REQUEST ACKNOWLEDGE message.

In step 508, the RAN node 508 can accumulate the received PDU Session AMBR belonging to each slice and obtain the slice specific AMBR for each slice (identified by the S-NSSAI) or for each slice type (identified by the SST).

In step 510, the RAN node 508 can limit the aggregate maximum bit rate that can be provided across all non-GBR QoS flows for each slice or for each slice type according to the calculated slice specific AMBR.

Example Embodiment 3

Figure 6:
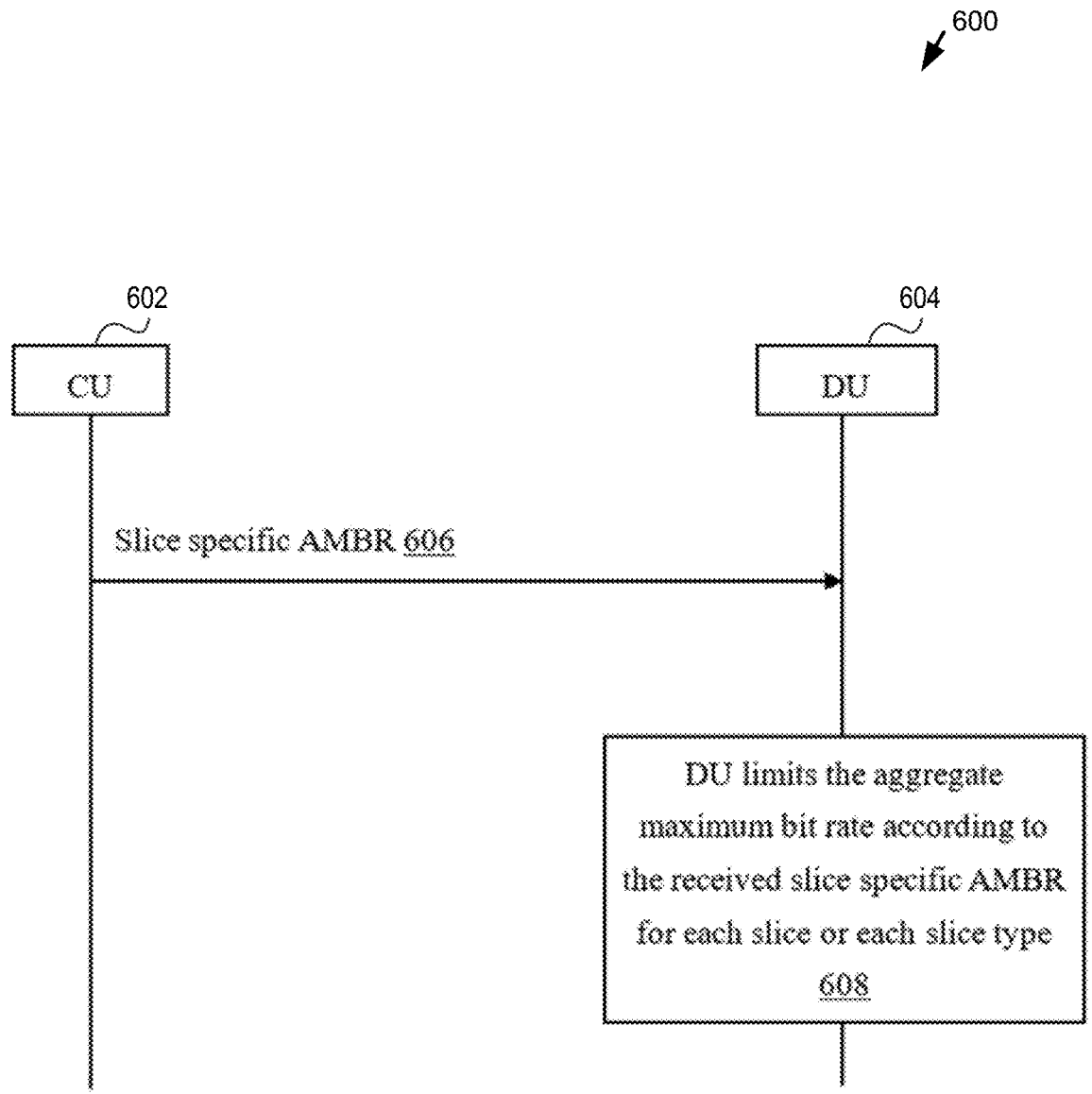
FIG. 6 illustrates an example signaling process for slice specific AMBR corresponding to a third example embodiment.

FIG. 6 illustrates an example signaling process 600 for slice specific AMBR corresponding to a third example embodiment.

In step 606, the CU 602 can send one or more slice specific AMBR for a UE to a DU 604, with one slice specific AMBR for each slice (identified by the S-NSSAI) or for each slice type (identified by the SST). The one or more slice specific AMBR can be included in the UE CONTEXT SETUP REQUEST message or UE CONTEXT MODIFICATION REQUEST message.

In step 608, the DU 604 can limit the aggregate maximum bit rate that can be provided across all non-GBR QoS flows for each slice or for each slice type according to the received slice specific AMBR.

Example Embodiment 4

Figure 7:
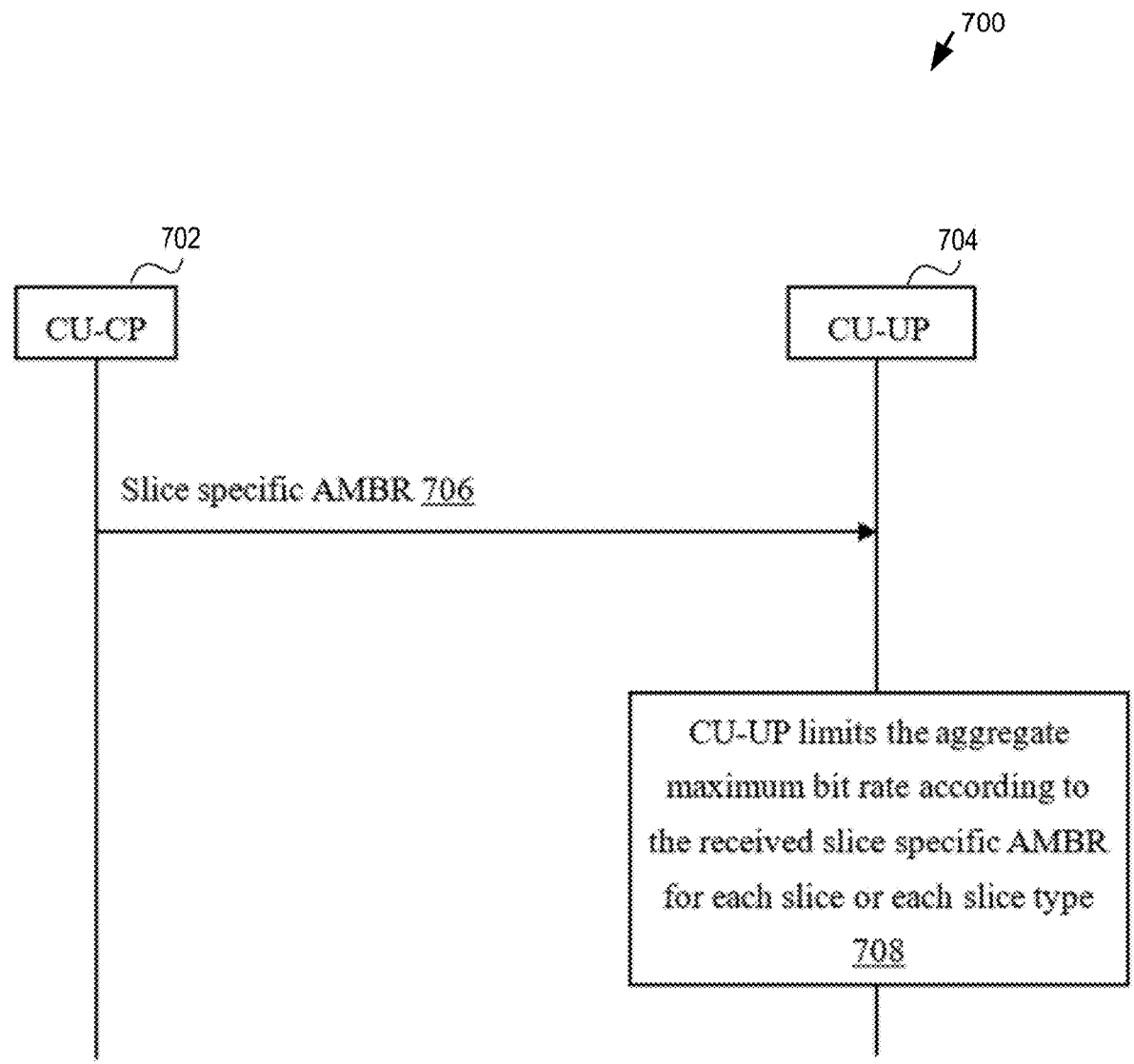
FIG. 7 illustrates an example signaling process for slice specific AMBR corresponding to a fourth example embodiment.

FIG. 7 illustrates an example signaling process 700 for slice specific AMBR corresponding to a fourth example embodiment.

In step 706, a CU-CP 702 can send one or more slice specific AMBR for a UE to a CU-UP 704, with one slice specific AMBR for each slice (identified by the S-NSSAI) or for each slice type (identified by the SST). The one or more slice specific AMBR can be included in the BEARER CONTEXT SETUP REQUEST message or BEARER CONTEXT MODIFICATION REQUEST message.

In step 708, the CU-UP 704 can limit the aggregate maximum bit rate that can be provided across all non-GBR QoS flows for each slice or for each slice type according to the received slice specific AMBR.

Example Embodiment 5

Figure 8:
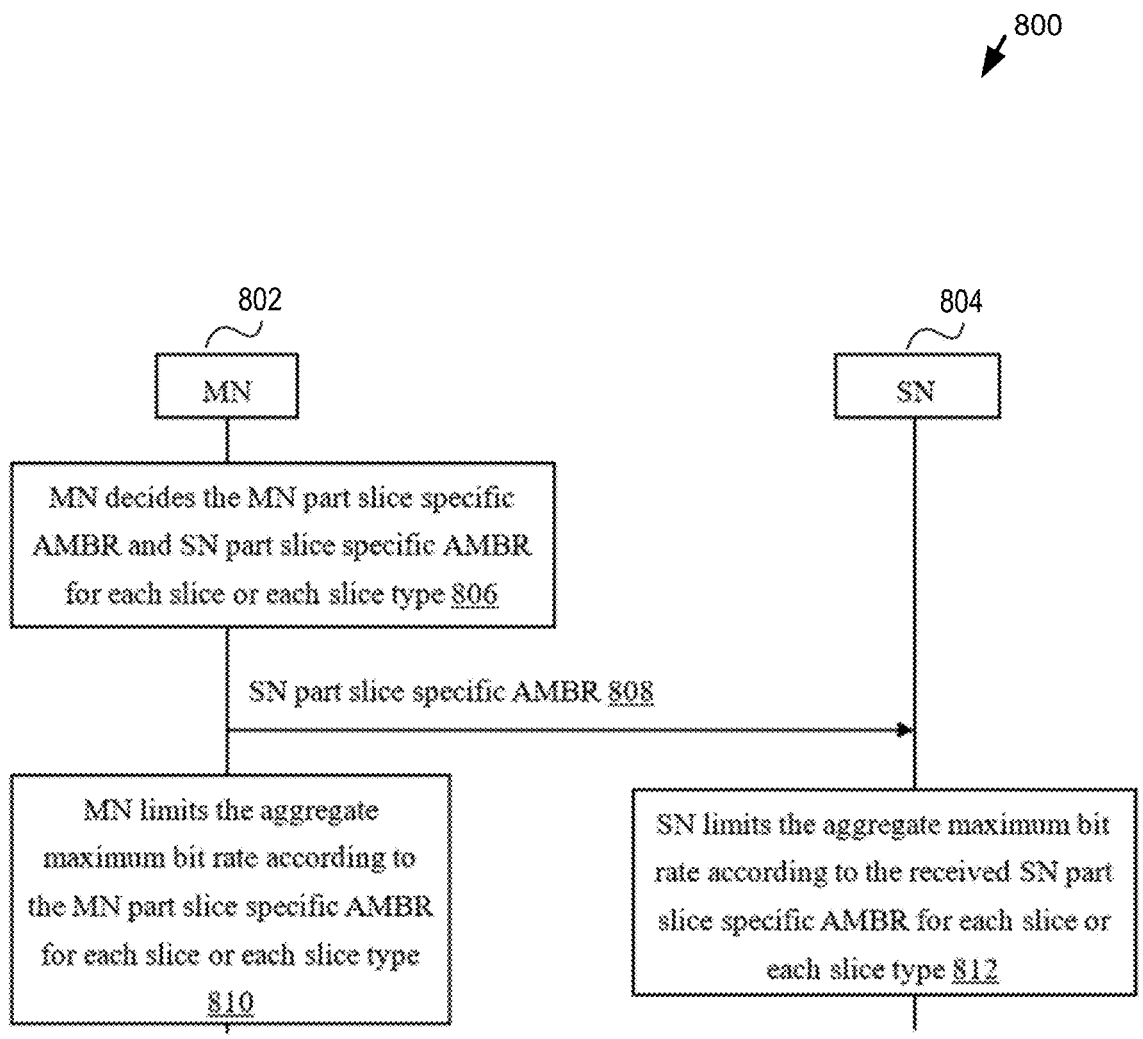
FIG. 8 illustrates an example signaling process for slice specific AMBR corresponding to a fifth example embodiment.

FIG. 8 illustrates an example signaling process 800 for slice specific AMBR corresponding to a fifth example embodiment.

In step 806, a MN 802 can determine a MN part slice specific AMBR and SN part slice specific AMBR for each slice (identified by the S-NSSAI) or for each slice type (identified by the SST).

In step 808, the MN 802 can send one or more SN part slice specific AMBR for a UE to a SN 804, with one SN part slice specific AMBR for each slice or for each slice type. The one or more SN part slice specific AMBR can be included in the S-NODE ADDITION REQUEST message, or S-NODE MODIFICATION REQUEST message.

In step 810, the MN 802 can limit the aggregate maximum bit rate that can be provided across all non-GBR QoS flows for each slice or for each slice type according to the MN part slice specific AMBR.

In step 812, the SN 804 can limit the aggregate maximum bit rate that can be provided across all non-GBR QoS flows for each slice or for each slice type according to the received SN part slice specific AMBR.

Example Embodiment 6

Figure 9:
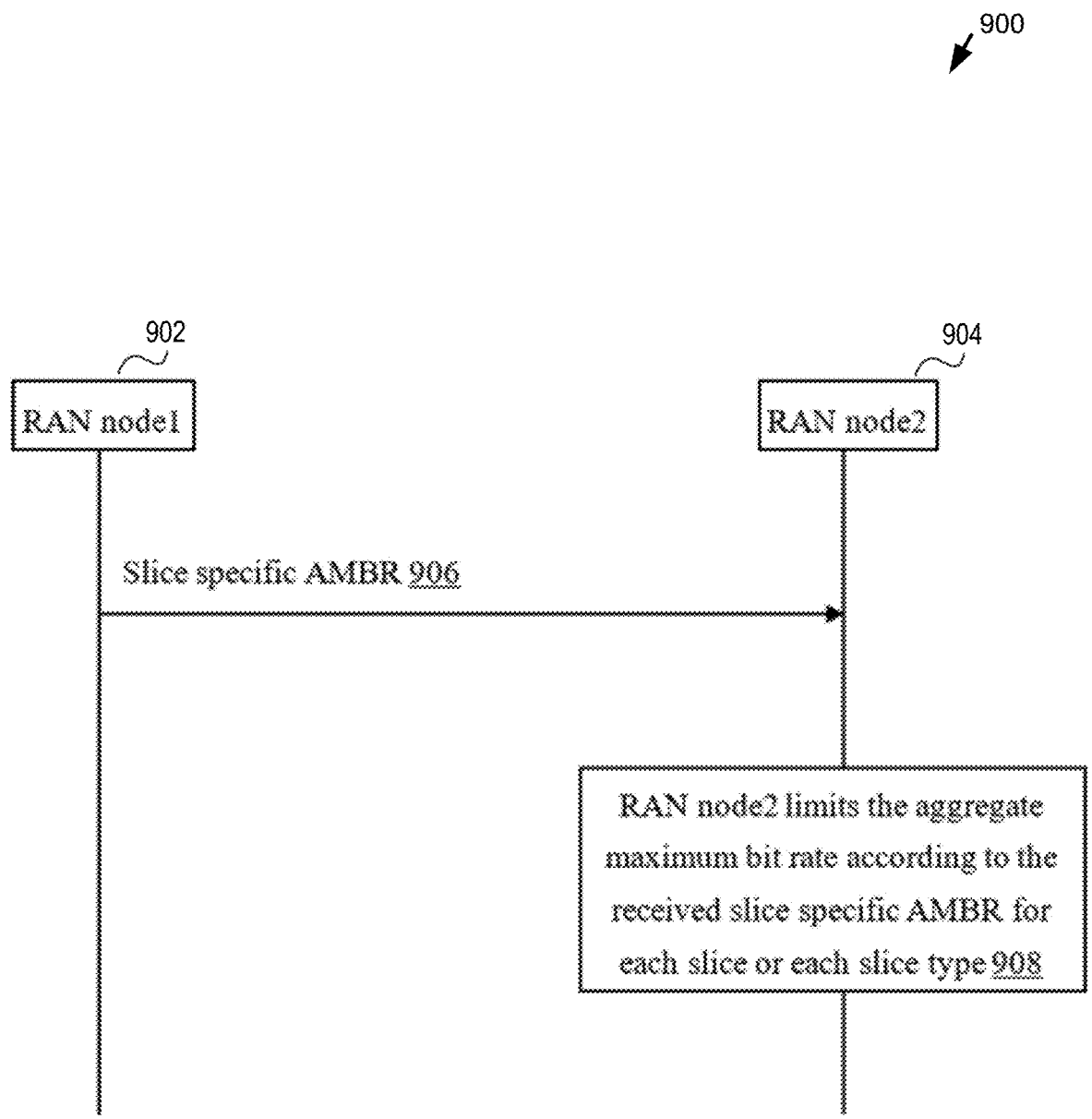
FIG. 9 illustrates an example signaling process for slice specific AMBR corresponding to a sixth example embodiment.

FIG. 9 illustrates an example signaling process 900 for slice specific AMBR corresponding to a sixth example embodiment.

In step 906, the RAN node1 902 can send one or more slice specific AMBR for a UE to a RAN node2 904, with one slice specific AMBR for each slice (identified by the S-NSSAI) or for each slice type (identified by the SST). The one or more slice specific AMBR can be included in the HANDOVER REQUEST message or RETRIEVE UE CONTEXT RESPONSE message.

In step 908, the RAN node2 904 can limit the aggregate maximum bit rate that can be provided across all non-GBR QoS flows for each slice or for each slice type according to the received slice specific AMBR.

Example Method for Configuring AMBRs

Figure 10:
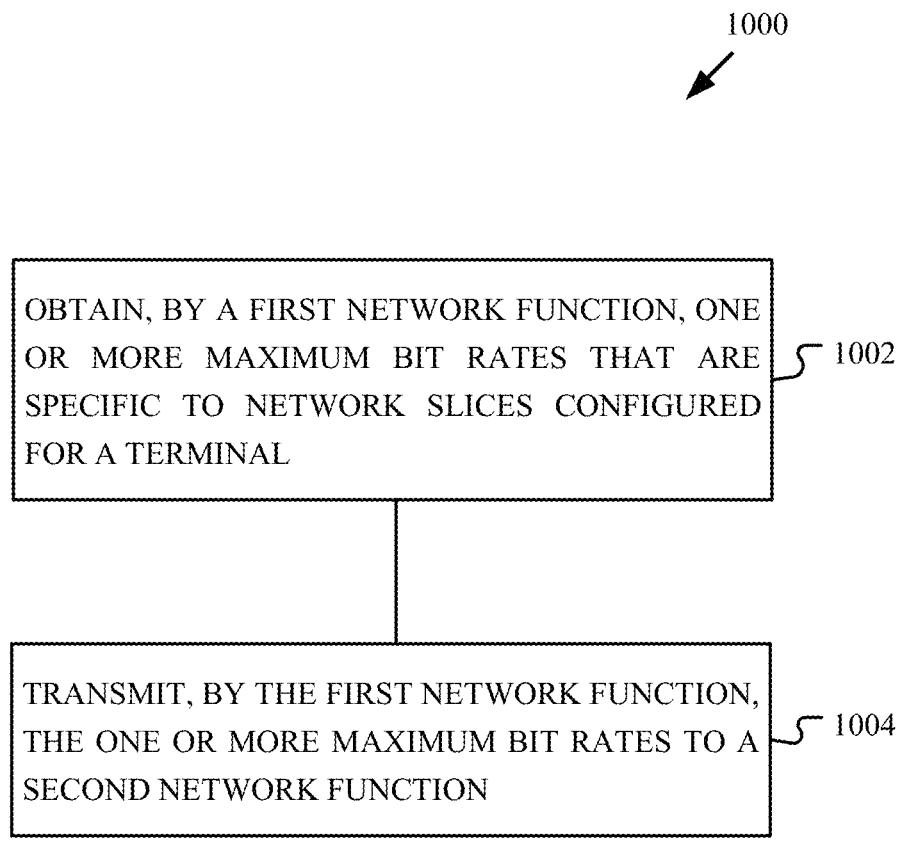
FIG. 10 is a block diagram of an example method for configuring network slice-specific AMBRs.

FIG. 10 is a block diagram of an example method 1000 for configuring network slice-specific AMBRs. The method may include obtaining, by a first network function, one or more maximum bit rates that are specific to network slices configured for a terminal (block 1002). The one or more maximum bit rates that are specific to network slices configured for a terminal may include a slice-specific AMBR as described herein.

A network function can include a set of functions implemented by a software program running on one or more processors and/or a hardware circuit. For instance, a network function can include any of a centralized unit (CU) or a distributed unit (DU), a user plane (UP) or a control plane (CP) of a node, a RAN node, a master node (MN) or a secondary node (SN), etc.

A network slice can include a network architecture that can enable multiplexing of virtualized and independent logical networks of a similar physical network infrastructure. A network slice can be isolated end-to-end network tailored to fulfill diverse requirements for various applications.

The method may also include transmitting, by the first network function, the one or more maximum bit rates to a second network function, wherein the second network function is configured to limit a bit rate of network flows for the terminal according to the one or more maximum bit rates (block 1004).

In some embodiments, each of the one or more maximum bit rates correspond to each network slice or each network slice type.

In some embodiments, the second network function is configured to limit the bit rate of network flows according to the one or more maximum bit rates by limiting any aggregated maximum bit rates provided across all non-guaranteed bit rate (non-GBR) quality of service (QoS) flows for each network slice or for each network slice type according to the one or more maximum bit rates.

In some embodiments, the first network function comprises a centralized unit of a network node and the second network function comprises a distributed unit of the network node.

In some embodiments, the first network function comprises a control plane of a network node and the second network function comprises a user plane of the network node.

In some embodiments, the first network function comprises a master node (MN) and the second network function comprises a secondary node (SN).

In some embodiments, the first network function comprises a first next generation (NG) radio access network (RAN) (NG-RAN) node and the second network function comprises a second NG-RAN node.

In some embodiments, the one or more maximum bit rates are included in any of a UE context setup request message or a UE context modification request message.

In some embodiments, the one or more maximum bit rates are included in any of a bearer context setup request message and a bearer context modification request message.

In some embodiments, the method includes determining by the first network function comprising the MN, a MN part of the one or more maximum bit rates and a SN part of the one or more maximum bit rates for each network slice or each network slice type.

In some embodiments, the SN part of the one or more maximum bit rates are included in any of a S-node addition request message and a S-node modification request message.

In some embodiments, the one or more maximum bit rates are included in any of a handover request message and a retrieve UE context response message.

In some embodiments, obtaining the one or more maximum bit rates includes receiving the one or more maximum bit rates from a core network node.

In some embodiments, the one or more maximum bit rates are received from the core network node via any of an initial context setup request message, a protocol data unit (PDU) session resource setup request message, a PDU session resource modify request message, a handover request message, and a path switch request acknowledge message.

In some embodiments, the method includes calculating, by the first network function, the one or more maximum bit rates based on one or more received PDU session aggregated maximum bit rates from a core network node.

In another embodiment, a method for wireless communication can include receiving, by a second network function, one or more maximum bit rates that are specific to network slices for a terminal from a first network function. The method may also include limiting, by the second network function, a bit rate of network flows for the terminal according to the one or more maximum bit rates.

In some embodiments, each of the one or more maximum bit rates correspond to each network slice or each network slice type.

In some embodiments, limiting the bit rate of the network flows according to the one or more maximum bit rates includes limiting any bit rates provided across all non-guaranteed bit rate (non-GBR) quality of service (QoS) flows for each network slice or for each network slice type according to the one or more maximum bit rates.

In some embodiments, the first network function comprises a centralized unit of a network node and the second network function comprises a distributed unit of the network node.

In some embodiments, the first network function comprises a control plane of a network node and the second network function comprises a user plane of the network node.

In some embodiments, the first network function comprises a master node (MN) and the second network function comprises a secondary node (SN).

In some embodiments, the first network function comprises a first next generation (NG) radio access network (RAN) (NG-RAN) node and the second network function comprises a second NG-RAN node.

In some embodiments, the one or more maximum bit rates are included in any of a UE context setup request message or a UE context modification request message.

In some embodiments, the one or more maximum bit rates are included in any of a bearer context setup request message and a bearer context modification request message.

In some embodiments, wherein the one or more maximum bit rates are included in any of a handover request message and a retrieve UE context response message.

Example Wireless System

Figure 11:
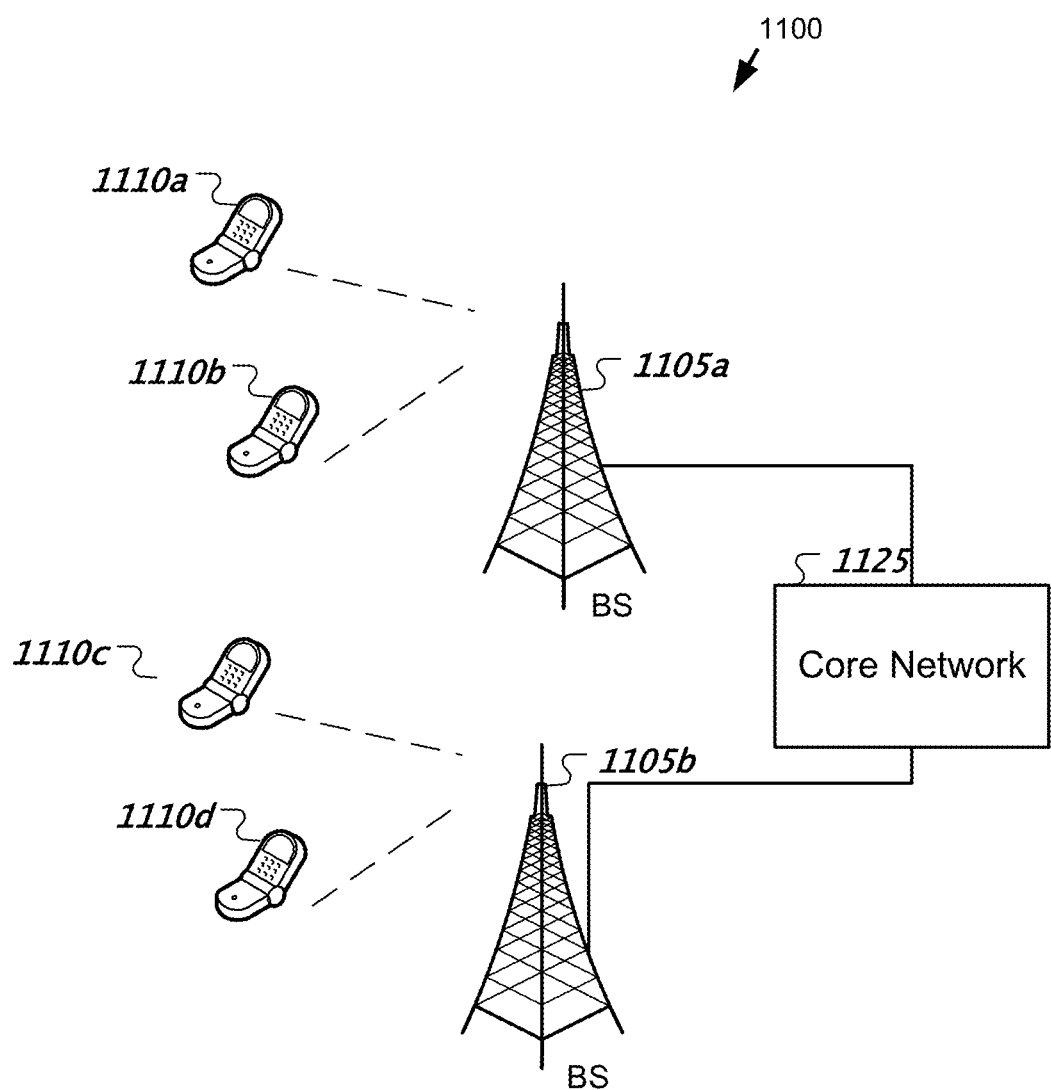
FIG. 11 shows an example of a wireless communication system where techniques in accordance with one or more embodiments of the present technology can be applied.

FIG. 11 shows an example of a wireless communication system where techniques in accordance with one or more embodiments of the present technology can be applied. A wireless communication system 1100 can include one or more base stations (BSs) 1105a, 1105b, one or more wireless devices or terminals 1110a, 1110b, 1110c, 1110d, and a core network 1125. A base station 1105a, 1105b can provide wireless service to wireless devices 1110a, 1110b, 1110c and 1110d in one or more wireless sectors. In some implementations, a base station 1105a, 1105b includes directional antennas to produce two or more directional beams to provide wireless coverage in different sectors. The base station may implement functionalities of a scheduling cell or a candidate cell, as described in the present document.

The core network 1125 can communicate with one or more base stations 1105a, 1105b. The core network 1125 provides connectivity with other wireless communication systems and wired communication systems. The core network may include one or more service subscription databases to store information related to the subscribed wireless devices 1110a, 1110b, 1110c, and 1110d. A first base station 1105a can provide wireless service based on a first radio access technology, whereas a second base station 1105b can provide wireless service based on a second radio access technology. The base stations 1105a and 1105b may be co-located or may be separately installed in the field according to the deployment scenario. The wireless devices 1110a, 1110b, 1110c, and 1110d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 12:
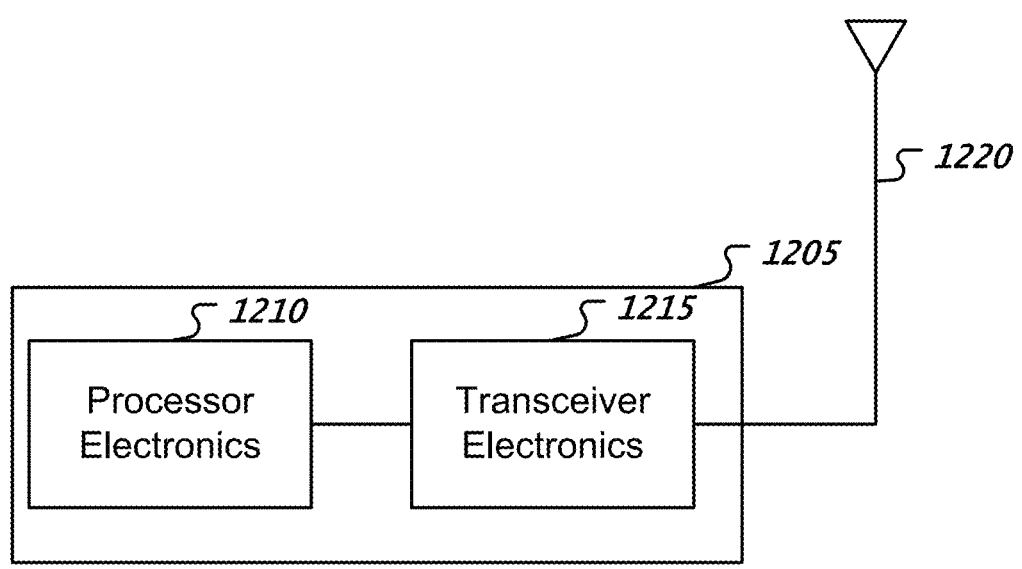
FIG. 12 is a block diagram representation of a portion of a hardware platform.

FIG. 12 is a block diagram representation of a portion of a hardware platform. A hardware platform 1205 such as a network node or a base station or a terminal or a wireless device (or UE) can include processor electronics 1210 such as a microprocessor that implements one or more of the techniques presented in this document. The hardware platform 1205 can include transceiver electronics 1215 to send and/or receive wired or wireless signals over one or more communication interfaces such as antenna 1220 or a wireline interface. The hardware platform 1205 can implement other communication interfaces with defined protocols for transmitting and receiving data. The hardware platform 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the hardware platform 1205.

CONCLUSION

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
    obtaining, by a first network function, one or more maximum bit rates that are specific to network slices configured for a terminal; and
    transmitting, by the first network function, the one or more maximum bit rates to a second network function, wherein the second network function is configured to limit a bit rate of network flows for the terminal according to the one or more maximum bit rates,
    wherein the method further comprises determining, by the first network function, a master node part of the one or more maximum bit rates and a secondary node part of the one or more maximum bit rates for each network slice or each network slice type.

2. The method of claim 1, wherein each of the one or more maximum bit rates correspond to each network slice or each network slice type.

3. The method of claim 1, wherein the second network function is configured to limit the bit rate of network flows according to the one or more maximum bit rates by limiting any aggregated maximum bit rates provided across all non-guaranteed bit rate (non-GBR) quality of service (QoS) flows for each network slice or for each network slice type according to the one or more maximum bit rates.

4. The method of claim 1, wherein the first network function comprises a centralized unit of a network node and the second network function comprises a distributed unit of the network node, or wherein the first network function comprises a control plane of a network node and the second network function comprises a user plane of the network node.

5. The method of claim 1, wherein the first network function comprises a master node (MN) and the second network function comprises a secondary node (SN), or wherein the first network function comprises a first next generation (NG) radio access network (RAN) (NG-RAN) node and the second network function comprises a second NG-RAN node.

6. The method of claim 1, wherein the one or more maximum bit rates are included in 1) any of a UE context setup request message or a UE context modification request message, 2) any of a bearer context setup request message and a bearer context modification request message, or 3) any of a handover request message and a retrieve UE context response message.

7. The method of claim 1, wherein the secondary node part of the one or more maximum bit rates are included in any of a S-node addition request message and a S-node modification request message.

8. The method of claim 1, wherein obtaining the one or more maximum bit rates includes receiving the one or more maximum bit rates from a core network node.

9. The method of claim 1, wherein the one or more maximum bit rates are received from a core network node via any of an initial context setup request message, a protocol data unit (PDU) session resource setup request message, a PDU session resource modify request message, a handover request message, and a path switch request acknowledge message.

10. The method of claim 1, further comprising:
    calculating, by the first network function, the one or more maximum bit rates based on one or more received PDU session aggregated maximum bit rates from a core network node.

11. A method for wireless communication, comprising:
    receiving, by a second network function, a secondary node part of one or more maximum bit rates that are specific to network slices for a terminal from a first network function that is configured to determine a master node part of the one or more maximum bit rates and the secondary node part of the one or more maximum bit rates for each network slice or each network slice type; and limiting, by the second network function, a bit rate of network flows for the terminal according to the one or more maximum bit rates.

12. The method of claim 11, wherein each of the one or more maximum bit rates correspond to each network slice or each network slice type.

13. The method of claim 11, wherein limiting the bit rate of the network flows according to the one or more maximum bit rates includes limiting any bit rates provided across all non-guaranteed bit rate (non-GBR) quality of service (QoS) flows for each network slice or for each network slice type according to the one or more maximum bit rates.

14. The method of claim 11, wherein the first network function comprises a centralized unit of a network node and the second network function comprises a distributed unit of the network node, or wherein the first network function comprises a control plane of a network node and the second network function comprises a user plane of the network node.

15. The method of claim 11, wherein the first network function comprises a master node (MN) and the second network function comprises a secondary node (SN), or wherein the first network function comprises a first next generation (NG) radio access network (RAN) (NG-RAN) node and the second network function comprises a second NG-RAN node.

16. The method of claim 11, wherein the one or more maximum bit rates are included in 1) any of a UE context setup request message or a UE context modification request message, 2) any of a bearer context setup request message and a bearer context modification request message, or 3) any of a handover request message and a retrieve UE context response message.

17. An apparatus for wireless communication comprising a processor that is configured to carry out a method comprising:

obtaining one or more maximum bit rates that are specific to network slices configured for a terminal; and transmitting the one or more maximum bit rates to a second network function, wherein the second network function is configured to limit a bit rate of network flows for the terminal according to the one or more maximum bit rates, wherein the method further comprises determining a master node part of the one or more maximum bit rates and a secondary node part of the one or more maximum bit rates for each network slice or each network slice type.

18. The apparatus of claim 17, wherein the method further comprises:

calculating the one or more maximum bit rates based on one or more received PDU session aggregated maximum bit rates from a core network node.

* * * * *